3,390,177
ARALKENYL-AMINOGUANIDINES AND
THE SALTS THEREOF
Robert Paul Mull, Florham Park, N.J., assignor to Ciba Corporation, New York, N.Y., a corporation of Delaware
No Drawing. Filed Sept. 27, 1965, Ser. No. 490,656
6 Claims. (Cl. 260—564)

ABSTRACT OF THE DISCLOSURE

Aralkenyl-aminoguanidines, e.g. those of the formula

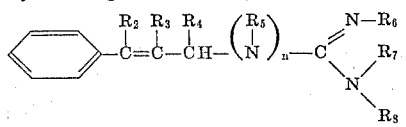

$R_2$ to $R_7$=H or alkyl
$R_8$=H or $NH_2$
$n$=1 (or 2 if $R_8$=H)

and acid addition salts thereof exhibit hypotensive effects.

---

The present invention concerns and has for its object the provision of aralkenyl-aminoguanidines and salts thereof, as well as methods for their preparation.

More particularly the invention relates to compounds having the Formula I

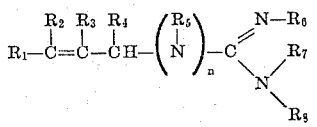

in which $R_1$ stands for carbocyclic aryl, each of $R_2$, $R_3$, $R_4$, $R_6$ and $R_8$ for hydrogen or lower alkyl, one of $R_5$ and $R_7$ for amino, mono- or di-lower alkylamino and the other for hydrogen or lower alkyl, $n$ for the integer 1 and, in case $R_5$ and $R_7$ stand for hydrogen or lower alkyl, also for the integer 2, and acid addition salts thereof.

The carbocyclic aryl group $R_1$ is more especially mono- or bicyclic carbocyclic aryl, above all phenyl, as well as 1- or 2-naphthyl, which is unsubstituted or may have one or more than one of the same or of different substituents attached to any of the positions available for substitution. Such substituents are, for example, lower alkyl, e.g. methyl, ethyl, n- or i-propyl, n-, i-, sec. or tert. butyl, etherified hydroxy or mercapto, especially lower alkoxy, e.g. methoxy, ethoxy, n- or i-propoxy or n-butoxy, as well as lower alkenyloxy, e.g. allyloxy, or lower alkylenedioxy, e.g. methylenedioxy, or lower alkylmercapto, e.g. methyl- or ethyl-mercapto, esterified hydroxy, especially halogeno, e.g. fluoro, chloro or bromo, as well as trifluoromethyl, lower alkoxy-carbonyloxy, e.g. methoxy- or ethoxy-carbonyloxy, or lower alkanoyloxy, e.g. acetoxy or propionyloxy, acyl, such as lower alkanoyl, e.g. acetyl or propionyl, nitro, amino, preferably tert. amino, such as di-lower alkylamino, e.g. dimethylamino or diethylamino.

Preferred aryl, groups $R_1$ are phenyl, (lower alkyl)-phenyl, (lower alkoxy)-phenyl, (halogeno)-phenyl, (trifluoromethyl)-phenyl, (lower alkoxy-carbonyloxy)-phenyl, (lower alkanoyloxy)-phenyl, (lower alkanoyl)-phenyl and (di-lower alkylamino)-phenyl.

The groups $R_2$, $R_3$, $R_4$, $R_6$ and $R_8$ as well as one of the groups $R_5$ and $R_7$ stand primarily for hydrogen, but may also be one of the lower alkyl groups exemplified above. They preferably contain one to four carbon atoms and are particularly methyl, groups. Such lower alkyl groups are also present in the mono- or di-lower alkylamino groups $R_5$ and $R_7$ respectively.

The compounds of the invention exhibit valuable pharmacological properties. Apart from their activity to increase the coronary blood flow, they show primarily hypotensive effects, which are of quick onset and considerable duration. This can be demonstrated in animal tests using, for example, normotensive anesthetized cats and dogs as well as unanesthetized normotensive and renal hypertensive dogs as tests objects. The new compounds are, therefore, useful as hypotensive agents and coronary dilatants. Furthermore, they are useful as intermediates in the preparation of other valuable, especially pharmacologically active compounds.

Particularly useful are compounds of the Formula I, in which $R_1$ stands for phenyl, (lower alkyl)-phenyl, (lower alkoxy)-phenyl, (halogeno)-phenyl, (trifluoromethyl)-phenyl, (lower alkoxy-carbonyloxy)-phenyl, (lower alkanoyloxy)-phenyl, (lower alkanoyl)-phenyl and (di-lower alkyl amino)-phenyl, each of $R_2$, $R_3$, $R_4$, $R_6$ and $R_8$ for hydrogen or alkyl with 1 to 4 carbon atoms, one of $R_5$ and $R_7$ for amino, mono- or dialkylamino and the other for hydrogen or alkyl, in which $R_5$ and $R_7$ groups alkyl also contains 1 to 4 carbon atoms, $n$ for the integer 1 and, in case $R_5$ and $R_7$ stand for hydrogen or alkyl, also for the integer 2, and pharmaceutically acceptable acid addition salts thereof.

Especially mentioned are compounds of the Formula II

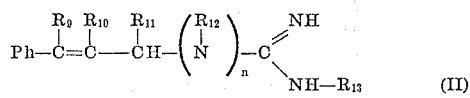

in which Ph stands for phenyl, mono- or di-(lower alkyl)-phenyl, mono(lower alkoxy)-phenyl, mono(halogeno)-phenyl or (trifluoromethyl)-phenyl, each of $R_9$, $R_{10}$ and $R_{11}$ for hydrogen or methyl, one of $R_{12}$ and $R_{13}$ for amino and the other for hydrogen, $n$ for the integer 1 and, in case $R_{12}$ and $R_{13}$ stand for hydrogen, also for the integer 2, and pharmaceutically acceptable acid addition salts thereof, and in particular the hydrochloride and hemisulfate of compounds having the Formula III

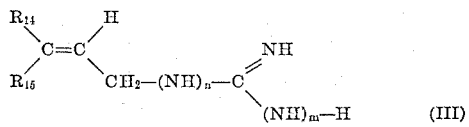

in which one of $R_{14}$ and $R_{15}$ stands for hydrogen and the other for phenyl and one of the integers $n$ and $m$ for 1 and the other for 2, which, when injected intravenously or into a loop of the small intestine of anesthetized normotensive dogs at a dose between about 1 and 10 mg./kg./day or given orally in about the same dosage range to unanesthetized normotensive or renal hypertensive dogs, exhibit an outstanding hypotensive effect.

The compounds of this invention are prepared according to known methods. For example, they are prepared by the process wherein, (a) An aralkenylhydrazine or -amine is reacted with a cyanamide, 1-guanyl-pyrazole, guanidine, cyanhydrazide, 1-aminoguanyl-pyrazole, aminoguanidine or an etherified isourea, isothiourea, isosemicarbazide or isothiosemicarbazide or (b) An aralkenylcyanamide, -cyanhydrazide, -guanidine, -urea, -thiourea, -semicarbazide, -thiosemicarbazide or an O- or S-ether thereof, is subjected to ammonolysis, aminolysis or hydrazinolysis, with the provision that the reactants mentioned under (a) and (b) together contain one hydrazino moiety only or (c) In an aralkenoyl- or thioaralkenoyl-aminoguanidine the oxo- or thiono group is reduced and, if desired, a resulting base is converted into a salt or a resulting salt is converted into the corresponding base or into another salt and/or a resulting mixture of isomers is separated into the single isomers.

Ethers of the urea, thiourea, semicarbazide and thiosemicarbazide compounds mentioned under (a) and (b) are, for example, the lower alkyl ethers, such as the methyl, ethyl, propyl, or butyl ethers. The other reactants mentioned may be unsubstituted or correspondingly substituted by lower alkyl such as that mentioned above, provided that the aralkenylhydrazine or -amine compounds mentioned under (a) and the amine or hydrazine mentioned under (b) contains at least one hydrogen atom bound to nitrogen. The 1-guanyl-pyrazoles may also contain substituents, such as lower alkyl, preferably in the 3- and/or 5-position.

The reduction of an oxo group mentioned under (c) may be carried out with the use of a complex light metal hydride, particularly an alkali metal aluminum hydride, e.g. lithium aluminum hydride or sodium aluminum hydried, or an alkaline earth metal aluminum hydride, e.g. magnesium aluminum hydride. If necessary, activators, such as aluminum chloride, may be used together with the hydride. The reduction of the thiono group preferably is carried out by careful hydrogenation in the presence of Raney nickel.

The above mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic, or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, aminobenzoic, anthranilic, hydroxybenzoic, salicylic, aminosalicylic, embonic, nictotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts of the new compounds, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts.

For example, the cyanamide reagent mentioned under item (a) may be formed in situ from a nitroso-guanidine, such as methylcyanamide from 1-nitroso-3-methyl-guanidine and analogous also the cyanhydrazide. The ammonia, primary or secondary amine or hydrazine used in reaction (b) may also be released during the reaction from a corresponding salt or addition compound, such as ammonium sulfate, methylammonium acetate, urotropin, hydrazine hydrate and the like. Preferably one of the reactants mentioned under (a) and (b) is used in the form of its salt which especially is derived from a mineral acid, such as a hydrohalic, sulfuric, phosphoric or nitric acid, or from a metal, such as an alkali or alkaline earth metal, e.g. sodium, potassium or calcium. Such metal salts are preferably used from cyanamides or -hydrazides, which may be reacted with an ammonium or hydrazine salt, such as ammonium nitrate or hydrazine sulfate.

Mainly, those starting materials should be used in the reactions of the invention that lead to the formation of those compounds indicated above as being specially valuable.

The starting materials are known or, if new, may be prepared according to known methods. Most of the starting materials used are described in co-pending application Ser. No. 322,018 filed Nov. 7, 1963, now U.S. Patent No. 3,252,861.

The starting materials as well as the compounds of the invention may be in the form of mixtures of isomers or of single isomers. Thus, they are preferably in the form of their geometric cis-and trans-isomers. A mixture of such isomers may be separated by fractional crystallization and/or chromatography.

The compounds of the invention can be used in the free form or in the form of their salts, for example, for the manufacture of pharmaceutical preparations containing the said compounds in admixture with organic or inorganic, solid or liquid pharmaceutical excipients suitable especially for enteral but also for parenteral administration. Suitable excipients are substances that do not react with the new compounds, for example, water, gelatine, lactose, starch, stearyl alcohol, magnesium stearate, talc, vegetable oils, benzyl alcohols, gums, propylene glycols, white petroleum jelly and other known medicinal excipients. The pharmaceutical preparations may be, for example, tablets, dragees or capsules, or in liquid form as solutions, suspensions or emulsions. They may be sterilized and/or contain adjuvants, such as preserving, stabilizing, wetting or emulsifying agents, solution promoters, salts for regulating the osomotic pressure or buffers. They may further contain other therapeutically valuable substances. The pharmaceutical preparations are prepared by conventional methods.

The following examples illustrate the invention; temperatures are given in degrees centigrade and all parts mentioned are parts by weight.

Example 1

The mixture of 7.4 g. trans-cinnamylhydrazine, 6.95 g. S-methyl-isothiourea sulfate and 75 ml. water is refluxed for 6 hours while stirring the mixture under nitrogen. After cooling, it is filtered and the residue recrystallized from water to yield the trans-1-(cinnamylamino)-guanidine hemisulfate of the formula

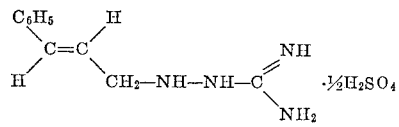

melting at 235–238°.

The starting material is prepared as follows: The solution of 22.56 g. trans-cinnamyl chloride in 150 ml. ethanol is added dropwise to 74.00 g. hydrazine hydrate in 50 ml. ethanol while stirring. The mixture is refluxed for 20 hours and concentrated in vacuo. To the residue, 40% aqueous sodium hydroxide is added, the mixture extracted with chloroform, the extract dried over potassium carbonate, filtered, evaporated, the residue distilled and the fraction boiling at 112–120°/0.3 mm. collected; it represents the trans-cinnamylhydrazine.

Example 2

The mixture of 2.66 g. cis-cinnamylamine, 4.6 g. S-methyl-2-isothiosemicarbazide hydroiodide and 10 ml. water is refluxed for 4 hours, cooled and filtered. The residue is recrystallized from acetonitrile to yield the cis-1-cinnamyl-3-amino-guanidine hydroiodide of the formula $$\begin{array}{c} C_6H_5 \\ \diagdown \\ H \end{array} C=C \begin{array}{c} CH_2-NH \\ \diagdown \\ H \end{array} C \begin{array}{c} NH \\ \diagup \\ NH-NH_2 \end{array} \cdot HI \quad \text{III}$$

Example 3

The mixture of 5.0 g. trans-cinnamylamine, 5.3 g. S-methyl-2-isothiosemicarbazide hydrochloride and 30 ml. methanol is refluxed for 6 hours and then concentrated in vacuo. The residue crystallizes upon addition of petroleum ether; it is recrystallized from acetonitrile and isopropanol to yield the trans-1-cinnamyl-3-amino-guanidine hydrochloride of the formula $$\begin{array}{c} C_6H_5 \\ \diagdown \\ H \end{array} C=C \begin{array}{c} H \\ \diagup \\ CH_2-NH-C \end{array} \begin{array}{c} NH \\ \diagup \\ NH-NH_2 \end{array} \cdot HCl$$

melting at 136–139°.

Example 4

According to the method described in the previous examples the following compounds are prepared from the equivalent amount of the corresponding starting materials:

trans-1-cinnamylamino-2,3-dimethyl-guanidine hydroiodide,
trans-1-(p-methoxy-cinnamyl)-3-amino-guanidine hydrochloride,
trans-1-(o-chloro-cinnamyl)-3-amino-guanidine hydrochloride,
trans-1-(p-chloro-cinnamyl)-3-amino-guanidine hydrochloride,
cis-1-(p-methyl-cinnamyl)-3-amino-guanidine hydrochloride,
cis-1-(o,p-dimethyl-cinnamyl)-3-amino-guanidine hydrochloride,
cis-1-(m-methyl-cinnamylamino)-guanidine hemisulfate,
cis-1-(p-methoxy-cinnamyl)-3-amino-guanidine hydrochloride and
cis-1-(p-trifluoromethyl-cinnamyl)-3-amino-guanidine hydrochloride.

Example 5

The mixture of 13.5 g. trans-cinnamyl-cyanamide, 10.4 g. hydrazine dihydrochloride and 100 ml. 15% aqueous hydrazine is heated for 3 hours in an autoclave to 130° while agitating. Upon cooling the reaction mixture is concentrated in vacuo and the residue recrystallized from isopropanol to yield the trans-1-cinnamyl-3-amino-guanidine hydrochloride which is identical with that obtained according to Example 3.

Example 6

The mixture of 2.45 g. N-(trans-cinnamyl)-S-methyl-isothiourea sulfate, 15 ml. methanol, 4.72 g. mercuric chloride and 1.0 g. hydrazine hydrate is stirred for 6 hours while slightly warming. It is then filtered, the filtrate acidified with hydrochloric acid, concentrated under reduced pressure and the residue is recrystallized from isopropanol to yield the trans-1-cinnamyl-3-amino-guanidine hydrochloride which is identical with that described in Example 3.

Several starting materials and intermediates used in the process of the present invention are described in copending application Ser. No. 490,135 filed Sept. 24, 1965, now U.S. Patent No. 3,332,988.

Example 7

1000 tablets each containing 0.015 g. of the active ingredient—

| Material: | Grams |
|---|---|
| Trans-1-cinnamyl-3-amino-guanidine hydrochloride | 15.0 |
| Tragacanth | 3.0 |
| Lactose | 123.0 |
| Corn starch | 7.5 |
| Magnesium stearate | 1.5 |
| Aqueous ethanol 50%, q.s. | |

Procedure.—The hydrochloride, the tragacanth and the lactose are mixed in a suitable mixer and granulated with the ethanol. The granulate is passed through a No. 10 screen, dried at room temperature with circulating air, and passed through a No. 16 screen. The screened material is returned to the mixer, the corn starch and the magnesium stearate are added and mixing is continued. The mixture is again passed through a No. 16 screen and compressed into tablets, each weighing 0.15 g. using 10/32 inch standard, concave punches, uppers bisected.

What is claimed is:

1. The compound having the formula $$R_1-\underset{\underset{R_2}{|}}{C}=\underset{\underset{R_3}{|}}{C}-\underset{\underset{R_4}{|}}{C}H-\left(\underset{\underset{N}{|}}{\overset{R_5}{|}}\right)_n-C\diagup_{\diagdown N \diagdown R_8}^{N-R_6}$$

in which $R_1$ stands for phenyl, mono- or di- lower alkyl-phenyl, mono- lower alkoxy-phenyl, mono-halogeno-phenyl or trifluoromethyl-phenyl, each of $R_2$, $R_3$, $R_4$, $R_5$, $R_6$ and $R_8$ stands for hydrogen or lower alkyl, $R_7$ stands for hydrogen or amino, $n$ stands for the integer 1 and in case $R_7$ stands for hydrogen, also for the integer 2, or the acid addition salts thereof.

2. A compound as claimed in claim 1, in which formula $$\left[Ph-\underset{\underset{R_9}{|}}{C}=\underset{\underset{R_{10}}{|}}{C}-\underset{\underset{R_{11}}{|}}{C}H\left(\underset{\underset{N}{|}}{\overset{R_{12}}{|}}\right)_n-C\diagup_{\diagdown NH-R_{13}}^{NH}\right]$$

$R_1$ stands for phenyl, mono- or di- lower alkyl-phenyl, mono- lower alkoxy-phenyl, mono-halogeno-phenyl or trifluoromethyl-phenyl, each of $R_2$, $R_3$ and $R_4$ stands for hydrogen or methyl, each of $R_5$, $R_6$ and $R_8$ is hydrogen, $R_7$ is hydrogen or amino, $n$ is the integer 1 and in case $R_7$ stands for hydrogen, also for the integer 2, or pharmaceutically acceptable acid addition salts thereof.

3. The compound having the formula $$\begin{array}{c} R_{14} \\ \diagdown \\ R_{15} \end{array} C=C \begin{array}{c} H \\ \diagup \\ CH_2-(NH)_n-C \end{array} \diagup_{\diagdown (NH)_m-H}^{NH}$$

in which one of $R_{14}$ and $R_{15}$ stands for hydrogen and the other for phenyl and one of the integers $n$ and $m$ for 1 and the other for 2, the hydrochloride or hemisulfate thereof.

4. The trans-1-cinnamylamino-guanidine or its hemisulfate.

5. The cis-1-cinnamyl-3-amino-guanidine or its hydroiodide.

6. The trans-1-cinnamyl-3-amino-guanidine or its hydrochloride.

References Cited

UNITED STATES PATENTS 3,252,861  5/1966  Mull _____ 167—65

CHARLES B. PARKER, *Primary Examiner.*

ROBERT V. HINES, *Examiner.*

UNITED STATES PATENT OFFICE
CERTIFICATE OF CORRECTION

Patent No. 3,390,177                                June 25, 1968

Robert Paul Mull

It is certified that error appears in the above identified patent and that said Letters Patent are hereby corrected as shown below:

Column 6, lines 40 to 43, cancel the formula.

Signed and sealed this 20th day of January 1970.

(SEAL)
Attest:

Edward M. Fletcher, Jr.                    WILLIAM E. SCHUYLER, JR.
Attesting Officer                              Commissioner of Patents